United States Patent
Ludwig et al.

(10) Patent No.: US 11,568,416 B2
(45) Date of Patent: Jan. 31, 2023

(54) CRYPTOCURRENCY TRANSACTION PATTERN BASED THREAT INTELLIGENCE

(71) Applicant: International Business Machines Corporation, Armonk, NY (US)

(72) Inventors: Markus Ludwig, Breuna (DE); Marc Noske, Lohfelden (DE); Dirk Harz, Kassel (DE); Johannes Noll, Kassel (DE); Martin Steigemann, Fritzlar (DE)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 16/449,825

(22) Filed: Jun. 24, 2019

(65) Prior Publication Data

US 2020/0402061 A1   Dec. 24, 2020

(51) Int. Cl.
G06Q 40/06   (2012.01)
G06Q 20/40   (2012.01)
G06Q 20/06   (2012.01)

(52) U.S. Cl.
CPC ....... *G06Q 20/4016* (2013.01); *G06Q 20/065* (2013.01); *G06Q 20/4014* (2013.01)

(58) Field of Classification Search
CPC ............. G06Q 20/4016; G06Q 20/065; G06Q 20/4014; G06Q 40/00
See application file for complete search history.

(56) References Cited

U.S. PATENT DOCUMENTS

| | | | |
|---|---|---|---|
| 9,367,872 B1 | 6/2016 | Visbal et al. | |
| 10,027,696 B1 | 7/2018 | Rivlin et al. | |
| 10,721,336 B2* | 7/2020 | Banerjee | G06F 9/466 |
| 2014/0046818 A1* | 2/2014 | Chung | G06Q 40/00 705/35 |
| 2015/0287026 A1* | 10/2015 | Yang | G06Q 20/3825 705/69 |
| 2016/0300227 A1 | 10/2016 | Subhedar et al. | |
| 2018/0240107 A1* | 8/2018 | Andrade | G06Q 20/36 |

(Continued)

FOREIGN PATENT DOCUMENTS

KR   2031711 B1 * 10/2019 ........... G06Q 20/065

OTHER PUBLICATIONS

Mauro Conti, Sandeep Kumar E, Chhagan Lal, and Sushmita Ruj, A Survey on Security and Privacy Issues of Bitcoin, Dec. 2017, IEEE, web, 1-10 (Year: 2017).*

(Continued)

*Primary Examiner* — I Jung Liu
(74) *Attorney, Agent, or Firm* — Scott Dobson

(57) ABSTRACT

A method for identification of malicious internet content and campaigns is provided. The method extracts a cryptocurrency indicator within a compromised data set and inserts the cryptocurrency indicator into a threat intelligence database. The method identifies a set of cryptocurrency transactions associated with the cryptocurrency indicator. From the cryptocurrency indicator and the set of cryptocurrency transactions, the method generates a transaction graph with a set of features representing the set of cryptocurrency transactions. The method modifies the threat intelligence database with at least a portion of the transaction graph.

20 Claims, 7 Drawing Sheets

(56) References Cited

U.S. PATENT DOCUMENTS

2018/0278647 A1* 9/2018 Gabaev .................. G06F 21/52

OTHER PUBLICATIONS

Mauro Conti, Sandeep Kumar, Chhagan Lal, and Sushmita Ruj, A Survey on Security and Privacy Issues of Bitcoin, Dec. 25, 2017, IEEE, web, p. 1-10 (Year: 2017).*
Paquet-Clouston et al., "Ransomware Payments in the Bitcoin Ecosystem", arXiv:1804.04080v1 [cs.CR], Apr. 11, 2018, 10 pages.
Conti et al., "On the Economic Significance of Ransomware Campaigns: A Bitcoin Transactions Perspective", arXiv:1804.01341v5 [cs.CR], Aug. 11, 2018, 24 pages.

* cited by examiner

CRYPTOCURRENCY TRANSACTION PATTERN BASED THREAT INTELLIGENCE

BACKGROUND

Threat identification systems may correlate indicators of compromise. Such threat identification systems may correlate similar indicators of compromise which are of a limited number of types. Some threat identification systems analyze and identify financial impacts of known attacks or known attack types. Some threat identification systems analyze network activities for specified entities, performing long term analysis to build predictive threat maps.

SUMMARY

According to an embodiment described herein, a computer-implemented method for identification of cryptocurrency transaction patterns and malicious entities is provided. The method extracts a cryptocurrency indicator within a compromised data set. The method inserts the cryptocurrency indicator into a threat intelligence database and identifies a set of cryptocurrency transactions associated with the cryptocurrency indicator. The method generates a transaction graph from the cryptocurrency indicator and the set of cryptocurrency transactions. The transaction graph has a set of features representing the set of cryptocurrency transactions. The method modifies the threat intelligence database within at least a portion of features from the set of features of the transaction graph.

DETAILED DESCRIPTION

Figure 1:
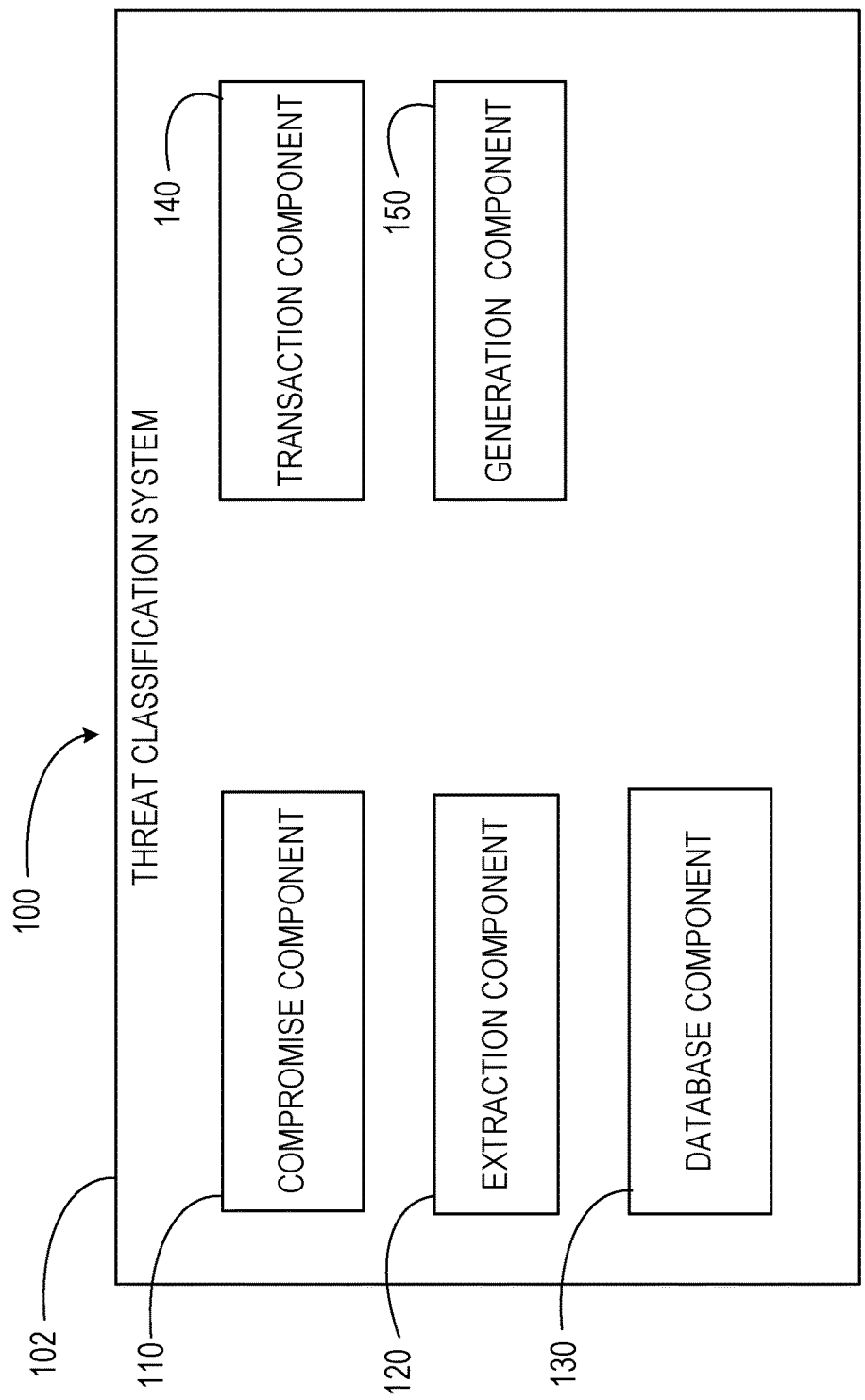
FIG. 1 depicts a block diagram of a computing environment for implementing concepts and computer-based methods, according to at least one embodiment.

The present disclosure relates generally to methods for threat identification, but not exclusively, to a computer-implemented method for identification of cryptocurrency transaction patterns and malicious entities for threat identification and mitigation. The present disclosure relates further to a related system for threat identification, and a computer program product for operating such a system.

Bad actors often try to monetize malicious activities, while remaining anonymous. Malicious activities of bad actors may be progressively harder to identify, and identification may often be based on behavior analysis. Such bad actors may use cryptocurrencies in their campaigns to extort or otherwise obtain money from victims without being identifiable. Cryptocurrency addresses are often reused for such purposes by the same bad actors and cooperating bad actors. Proper analysis of malicious activities and bad actors is useful for security analytics and protection against attacks and infections alike.

Embodiments of the present disclosure tag such cryptocurrency addresses as malicious as soon as the addresses have been identified in one source as being associated with malicious activities or campaigns. Tagging cryptocurrency addresses enables recognition of bad actors across differing campaigns. By searching for address information in other data sets, compromised data, and digital resources, embodiments of the present disclosure are able to tag content as malicious, as well as the associated bad actors. Using address information, and correlating relationships between cryptocurrency addresses, embodiments of the present disclosure may identify the existence of cryptocurrency address information on benign websites or other highjacked network resources. Some embodiments of the present disclosure trace and correlate publicly available information of cryptocurrency addresses to further identify or verify bad actors. Following such financial transfers of cooperating bad actors may track or trace cooperation using sent payments.

Some embodiments of the concepts described herein may take the form of a system or a computer program product. For example, a computer program product may store program instructions that, when executed by one or more processors of a computing system, cause the computing system to perform operations described above with respect to the computer implemented method. By way of further example, the system may comprise components, such as processors and computer readable storage media. The computer readable storage media may interact with other components of the system to cause the system to execute program instructions comprising operations of the computer implemented method, described herein. For the purpose of this description, a computer-usable or computer-readable medium may be any apparatus that may contain means for storing, communicating, propagating, or transporting the program for use, by, or in connection with, the instruction execution system, apparatus, or device.

Referring now to FIG. 1, a block diagram of an example computing environment 100 is shown. The present disclosure may be implemented within the example computing environment 100. In some embodiments, the computing environment 100 may be included within or embodied by a computer system, described below. The computing environment 100 may comprise a threat classification system 102. The threat classification system 102 may comprise a compromise component 110, an extraction component 120, a database component 130, a transaction component 140, and a generation component 150. The compromise component 110 determines a compromised status of data sets provided to the threat classification system. The extraction component 120 extracts cryptocurrency indicators from compromised data sets. The database component 130 inserts cryptocurrency indicators into threat intelligence databases and modifies threat intelligence databases. The transaction component 140 identifies sets of cryptocurrency transactions associated with the cryptocurrency indicator. The generation component 150 generates transaction graphs from cryptocurrency indicators and sets of cryptocurrency transactions. Although described with distinct components, it should be understood that, in at least some embodiments, components may be combined or divided, or additional components may be added, without departing from the scope of the present disclosure.

Figure 2:
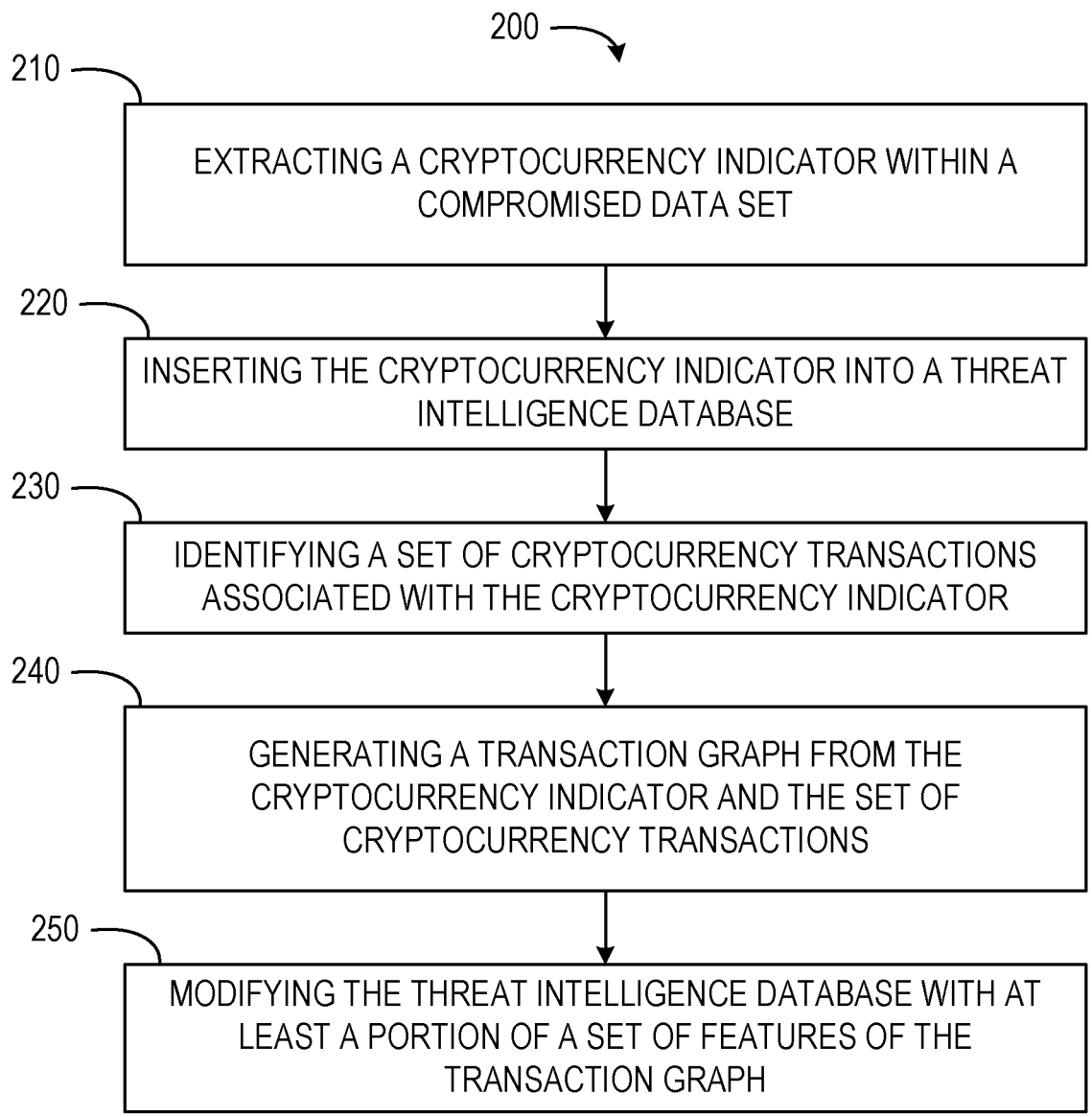
FIG. 2 depicts a flow diagram of a computer-implemented method for identification of cryptocurrency transaction patterns and malicious entities, according to at least one embodiment.

Referring now to FIG. 2, a flow diagram of a computer-implemented method 200 is shown. The computer-implemented method 200 is a method for identification of cryptocurrency transaction patterns and malicious entities. In some embodiments, the computer-implemented method 200 may be performed by one or more components of the computing environment 100, as described in more detail below.

At operation 210, the extraction component 120 extracts a cryptocurrency indicator within a compromised data set. The cryptocurrency indicator may also be extracted from data associated with the compromised data set, such as metadata or a linked document, file, web address, or computing resource. In some embodiments, the cryptocurrency indicator is a cryptocurrency address, such as a bitcoin address. The cryptocurrency indicator may also be a set of data. For example, the cryptocurrency indicator may include a cryptocurrency address, a cryptocurrency account identifier, a recipient address, a source address, combinations thereof, or any other suitable information defining, describing, or representing a cryptocurrency account or transaction. In some embodiments, the compromised data set is a data set representing a security threat to a system, application, account, computing device, or a user. A compromised data set may be associated with malicious activities, malicious campaigns, bad actors, malicious content, hijacked websites, infections, combinations thereof, or similar activities or threats. In some embodiments, the compromised data set may be a known compromised data set. For example, a compromised data set may be a phishing email or compromised document. The compromised data set may represent a single or first security event causing initiation of the method 200.

In some embodiments, prior to extraction of the cryptocurrency indicator, the compromise component 110 accesses a set of data. The compromise component 110 may access the set of data based on the set of data being received by a system. For example, the compromise component 110 may access the set of data through an email, an email scan, a virus scan, receipt of an access request at a firewall, or any other suitable automated access. By way of further example, the compromise component 110 may access the set of data by receiving the data from a user. The user may forward a suspicious email, a website link, a file, or any other suitable data (e.g., the set of data) to the compromise component 110.

The compromise component 110 determines the data set is compromised. In some embodiments, the compromise component 110 determines the data set is compromised based on a threat intelligence database. The data set may be the compromised data set including the cryptocurrency indicator. In some embodiments, the compromise component 110 may determine the data set is compromised based on analysis of an existing threat intelligence database. For example, compromise component 110 may match data, metadata, tags, email addresses, threat language, or any other information from the data set with known markers, tags, malicious sources, or characteristics of data sets previously identified to be compromised and logged in the threat intelligence database. The compromise component 110 may determine or identify the data set as being spam, abuse, malware, ransomware, or any other malicious or threatening data set using indicators of compromise from the threat intelligence database or any other suitable database.

At operation 220, the database component 130 inserts the cryptocurrency indicator into a threat intelligence database. The threat intelligence database may be the threat intelligence database used to determine whether the data set was compromised, as discussed above. The cryptocurrency indicator may be inserted into the threat intelligence database as an indicator of compromise. When inserted as an indicator of compromise, the cryptocurrency indicator becomes part of a set of indicators of compromise used by the threat intelligence database, or components of the present disclosure, to determine or identify compromised data sets, phishing attacks, campaigns threatening data security, bad actors, combinations thereof, and any other suitable data security threat. The set of indicators of compromise may include website addresses, cryptocurrency indicators, cryptocurrency addresses, IP addresses, combinations thereof, or any other suitable data or metadata identifying or suggesting a compromised data set. Indicators of compromise may be found by spam email analysis and extraction; website analysis and extraction; web crawling; abuse databases; malicious file analysis and extraction; social media platforms; threat intelligence feeds; combinations thereof; and any other suitable collection and analysis methodology.

In some embodiments, the database component 130 associates the cryptocurrency indicator with an entity identifier within the threat intelligence database. The entity identifier may represent a malicious entity or a non-malicious entity. Entity identifiers may be names, email addresses, IP addresses, combinations thereof, or any other suitably identifying information. The entity identifiers may be associated with malicious entities. Malicious entities may be individuals, companies, groups, users, or other actors known to be associated with security threats or campaigns. Entity identifiers may also be associated with non-malicious entities. Non-malicious entities may be companies, groups, users, individuals, or other actors who are not associated with security threats, as perpetrators or active participants in the security threats. In some instances, non-malicious entities may be individuals, companies, groups, or users whose identities, accounts, websites, or other resources have been compromised by malicious entities in order to mask security threats. In these instances, the non-malicious entities may be unwilling or unwitting participants in security threats through identity theft or hacking. Where a non-malicious entity is identified as being associated with the cryptocurrency indicator, the non-malicious entity or a resource (e.g., a website) of the non-malicious entity may be tagged as highjacked within the threat intelligence database.

In some embodiments, the database component 130 generates a reputation score for the cryptocurrency indicator. The reputation score may be generated based on an existing reputation score for the compromised data set, related compromised data sets, an associated entity, combinations thereof, or any other preexisting reputation score. In some embodiments, upon inserting the cryptocurrency indicator, the database component 130 generates the reputation score by associating a reputation score of an associated entity with the cryptocurrency indicator. The database component 130 may generate the reputation score by determining a ratio or quantification of a relative threat level (e.g., damage historically done by this threat or this type of threat), pervasiveness of threat type (e.g., number of users affected by this type of threat), pervasiveness of current threat (e.g., number of users affected by the current threat), associated entity (e.g., entity associated with the threat or with the cryptocurrency indicator), and combinations thereof. The database component 130 may increment, decrement, or otherwise modify the reputation score based on a single use of the cryptocurrency indicator, multiple uses of the cryptocurrency indicator, increasing use of the cryptocurrency indicator, or decreasing use of the cryptocurrency indicator.

The database component 130 associates the reputation score with the cryptocurrency indicator in the threat intelligence database. In some embodiments, the database component 130 associates the reputation score with the cryptocurrency indicator by inserting the reputation score into the threat intelligence database. The reputation score may be inserted into the threat intelligence database as metadata describing the cryptocurrency indicator. The reputation score may also be inserted into the threat intelligence database as a value in a table or other data structure defining attributes of the cryptocurrency indicator. In instances where the cryptocurrency indicator is associated with an entity identifier, the database component 130 associates the reputation score with both the cryptocurrency indicator and the entity identifier. In such instances, the database component 130 may insert the reputation score into the threat intelligence database in a single place, so as to associate the reputation score with both the cryptocurrency indicator and the entity identifier.

At operation 230, the transaction component 140 identifies a set of cryptocurrency transactions associated with the cryptocurrency indicator. In some embodiments, the transaction component 140 identifies the set of cryptocurrency transactions by retrieving the cryptocurrency indicator (e.g., a cryptocurrency address) from the threat intelligence database. The transaction component 140 gathers all transactions for the cryptocurrency indicator. The transaction component 140 may gather the transactions using any suitable method, such as using the Blockchain API. The identification of the set of cryptocurrency transactions may be performed using Representational State Transfer (RESTful) API and enable tracing of accounts, tagging additional accounts in a chain of transactions, and identifying malicious entities within the chain of transactions. The transaction component 140 may trace the transactions of the cryptocurrency indicator by determining incoming and outgoing transactions containing the cryptocurrency indicator as either a transferee or transferor address.

At operation 240, the generation component 150 generates a transaction graph from the cryptocurrency indicator and the set of cryptocurrency transactions. The transaction graph may associate and define relationships between members of the set of cryptocurrency transactions. In some embodiments, the transaction graph has a set of features representing the set of cryptocurrency transactions. The set of features may also define or represent interrelations or commonalities between the set of cryptocurrency transactions. The set of features may be gathered from the transactions and transaction parties or partners. The set of features may include a time range of transactions, an origin address, a source reputation, a number of transactions, an input value of each transaction, a number of address occurrences, a total value of the address, a percentage of a transaction compared to a total value, campaign identifiers, entity (e.g., bad actors) identifiers, a cryptocurrency type, cooperating bad actor identifiers, and any other suitable feature describing or defining aspects of at least one transaction of the set of cryptocurrency transactions.

At operation 250, the database component 130 modifies the threat intelligence database with at least a portion of the features from the set of features of the transaction graph. In some embodiments, the database component 130 modifies the threat intelligence database by inserting one or more features of the set of features into the threat intelligence database. The features may be inserted to link or associate two or more cryptocurrency indicators, two or more entity identifiers, two or more threat instances, two or more threat campaigns, and combinations thereof. The features may also be inserted to describe, define, or otherwise enrich the threat intelligence database by providing additional information for individual instances of cryptocurrency indicators, entity identifiers, threat instances, threat campaigns, and combinations thereof. The addition of the portion of features may enable additional or more accurate classification of existing and new threats using the threat intelligence database. Further, the portion of features inserted into the threat intelligence database may be used to calculate, recalculate, or modify reputation scores associated with cryptocurrency indicators or entity identifiers stored within the threat intelligence database.

Figure 3:
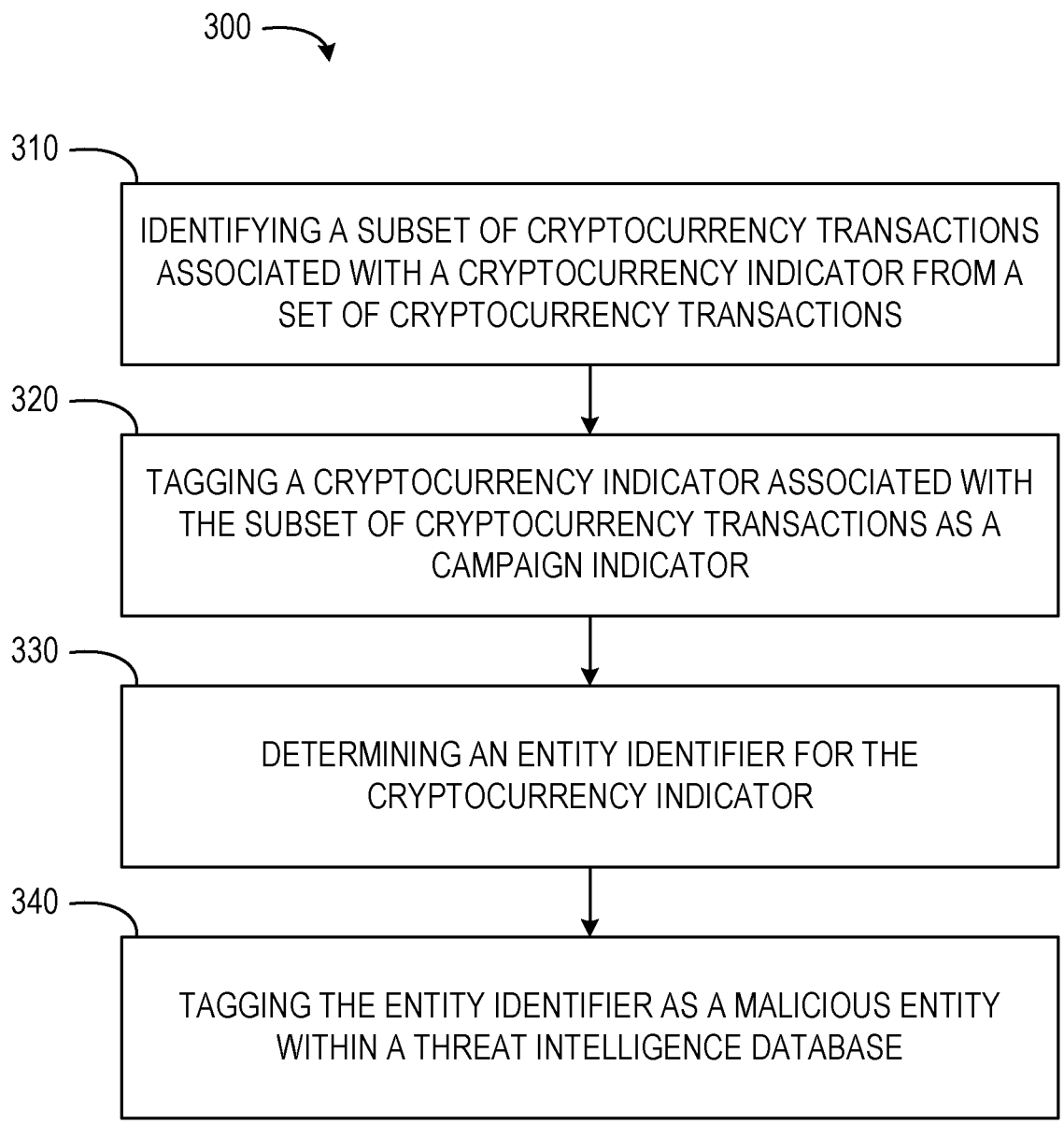
FIG. 3 depicts a flow diagram of a computer-implemented method for identification of cryptocurrency transaction patterns and malicious entities, according to at least one embodiment.

FIG. 3 shows a flow diagram of an embodiment of a computer-implemented method 300 for identification of cryptocurrency transaction patterns and malicious entities. The method 300 may be performed by or within the computing environment 100. In some embodiments, the method 300 comprises or incorporates one or more operations of the method 200. In some instances, operations of the method 300 may be incorporated as part of or sub-operations of the method 200.

In operation 310, the generation component 150 identifies a subset of cryptocurrency transactions from a set of cryptocurrency transactions. The subset of cryptocurrency transactions may be associated with the cryptocurrency indicator. The subset of cryptocurrency transactions may share one or more features of a set of features. In some embodiments, the generation component 150 identifies the subset of cryptocurrency transactions in a manner similar to or the same as described above with respect to operation 230 and operation 240. The generation component 150 may identify the subset of cryptocurrency transactions having the cryptocurrency indicator as a sending or receiving address. The sending address may indicate that the cryptocurrency indicator is a transferor of a cryptocurrency value or amount to an account of another user. The receiving address may indicate that the cryptocurrency indicator is a transferee, receiving a cryptocurrency value or amount to an account represented by the cryptocurrency indicator.

In some instances, the generation component 150 identifies the subset of cryptocurrency transactions as being associated with one or more threat instances. The generation component 150 may cross references transaction features (e.g., cryptocurrency addresses, transaction times, input values, and entity identifiers) indicating the transactions are part of or contemporaneous with compromised data sets. For example, the generation component 150 may match at least a portion of the set of cryptocurrency transactions with phishing emails, website highjacks, and other security threats. The cryptocurrency transactions matched with security threats may be included among the subset of cryptocurrency transactions. In instances where the subset of cryptocurrency transactions is matched to security threats, the generation component 150 may determine that the subset of cryptocurrency transactions is associated with the same or similar security threats or the same entity identifier. In such instances, common characteristics of the subset of cryptocurrency transactions may indicate that those transactions represent a campaign, a coordinated attempt by a bad actor or group of bad actors to obtain cryptocurrency through the same or similar means.

In operation 320, the generation component 150 tags a cryptocurrency indicator associated with the subset of cryptocurrency transactions as a campaign indicator. The generation component 150 may tag the cryptocurrency indicator based on the subset of cryptocurrency transactions having common characteristics. For example, where the cryptocurrency indicator is a receiving address for the subset of cryptocurrency transactions, the cryptocurrency indicator may be identified as a receiving address for a threat campaign. The generation component 150 may tag the cryptocurrency indicator with the campaign indicator within one or more of the threat intelligence database and the transaction graph.

In operation 330, the database component 130 determines an entity identifier for the cryptocurrency indicator. In some embodiments, the entity identifier is associated with at least a portion of the subset of cryptocurrency transactions. In some embodiments, the database component 130 determines the entity identifier by accessing the threat intelligence database to determine an entity identifier associated with the cryptocurrency indicator, where the cryptocurrency indicator is a receiving address or a transmitting address of the subset of cryptocurrency transactions. The database component 130 may also cooperate with one or more other components of the present disclosure to determine the entity identifier within features of the subset of cryptocurrency transactions. For example, the entity identifier may be a value or identifier indicating a common entity among the transactions, such as an account number.

In operation 340, the database component 130 tags the entity identifier as a malicious entity within the threat intelligence database. The database component 130 may tag the entity identifier within metadata or a data structure of the threat intelligence database. For example, the database component 130 may tag the entity identifier by marking a bit, a cell, a table position, or other suitable portion of data. The tag may indicate that the entity identifier is associated with one or more malicious actions or security threats.

In some embodiments, the database component 130 tags the entity identifier based on the campaign indicator. The database component 130 may receive the campaign indicator from the generation component 150. The database component 130 may insert the campaign indicator into the threat intelligence database in a position or metadata associated with the entity identifier. In some instances, the malicious entity tag and the campaign indicator may be separate indicators or tags. The malicious entity tag may indicate that the entity identifier has been associated with one or more bad actions. The campaign indicator may identify a specific campaign, set of cryptocurrency transactions, or set of security threats associated with the entity identifier and a single concerted threat campaign. In some instances, tagging the entity identifier with one or more campaign indicators defines the entity associated with the entity identifier as being part of one or more threat campaigns represented by the one or more campaign indicators.

Figure 4:
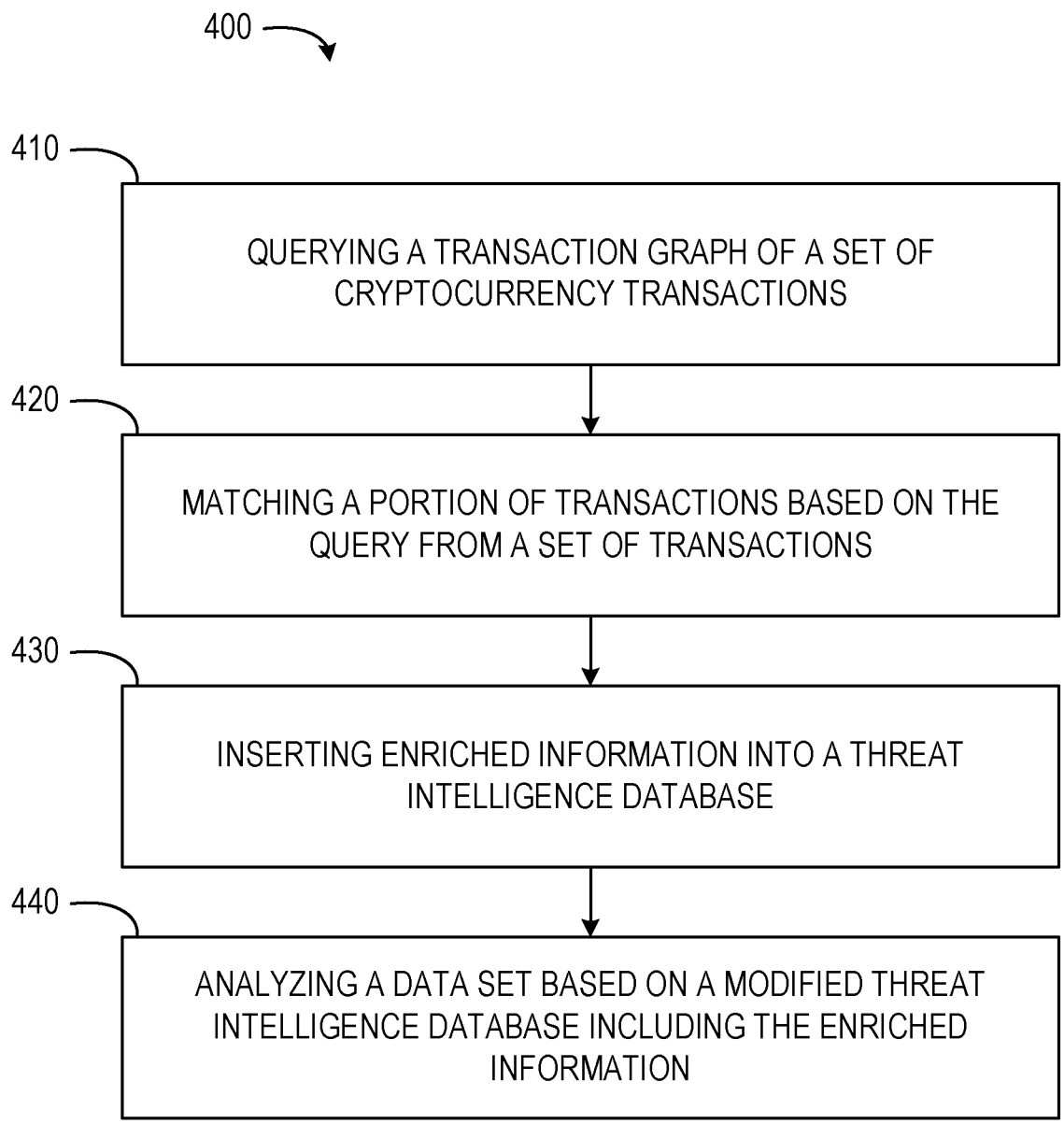
FIG. 4 depicts a flow diagram of a computer-implemented method for identification of cryptocurrency transaction patterns and malicious entities, according to at least one embodiment.

FIG. 4 shows a flow diagram of an embodiment of a computer-implemented method 400 for identification of cryptocurrency transaction patterns and malicious entities. The method 400 may be performed by or within the computing environment 100. In some embodiments, the method 400 comprises or incorporates one or more operations of the methods 200 or 300. In some instances, operations of the method 400 may be incorporated as part of or sub-operations of the methods 200 or 300.

In operation 410, the database component 130 queries a transaction graph of a set of cryptocurrency transactions. The database component 130 may query the transaction graph based on a rule set. The rule set may use, employ, or be generated from a set of features. In some instances, the set of features defines or describes the transaction graph. The transaction graph and set of features may be generated as described above with respect to operation 240. In some embodiments, the database component 130 queries one or more of the transaction graph and a threat intelligence database. The database component 130 may query the threat intelligence database after the threat intelligence database has been enriched by at least a portion of the transaction graph, as discussed above.

In some embodiments, the database component 130 queries the transaction graph by selecting or receiving selection of at least one rule from an initial pattern-based rule set. The at least one rule may be incorporated into a query generated by the database component 130 automatically or in response to one or more selections of a user. For example, the database component 130 may select all transactions where at least ten different input transaction addresses exist, and one hundred percent of input transactions are transferred more than once to the same target address. In this example, many victims may have paid money. A bad actor may transfer the money on a regular basis to a money collection pool address.

In operation 420, the database component 130 matches a portion of transactions based on the query of operation 410. In some embodiments, the database component 130 matches the portion of transactions by identifying features within the portion of transactions with represent or include characteristics or features of the query or the one or more rules embodied within the query. Matched transactions may be enriched with features such as reputation scores, campaign identifiers, entity identifiers (e.g., bad actor identifiers). For example, a target address may be labeled as part of a campaign, as belonging to a specified bad actor, or with an overall transaction value. The database component 130 may match transactions with the target address and labeled as part of a campaign, where the campaign indicator is a feature included in the query or represented by a rule embodied by the query.

In some instances, while querying the transaction graph, the database component determines the transaction graph has no matches. The database component 130 may send one or more of the query and the transaction database to an external review. In some instances, the external review is manual analysis. In instances, while querying the transaction graph, the database component 130 may cluster transactions based on features within or associated with each transaction in the transaction graph. Clustering of transactions may identify additional relations based on rules contained within or embodied by the query.

In operation 430, the database component 130 inserts enriched information into the threat intelligence database. In some embodiments, the enriched information includes or represents features identified within the portion of transactions matched in operation 420. For example, overall transaction values, campaign indicators, entity identifiers, cooperating entity identifiers, and reputation scores included within the portion of transactions may be inserted into the threat intelligence database. The database component 130 may associate the inserted enriched information into the threat intelligence database by associating the enriched information with a cryptocurrency indicator associated with the matched portion of transactions. The database component 130 may insert the enriched information in a manner similar to or the same as described above with respect to operation 250.

In operation 440, the compromise component 110 analyzes a data set based on the modified threat intelligence database including the enriched information. In some embodiments, the compromise component 110 applies the modified threat intelligence component to the data set to identify the data set as compromised. In some instances, the compromise component 110 analyzes the data set and determines a compromised status in a manner similar to or the same as described above with respect to operation 210. For example, where the data set is a website, the compromise component 110 may classify the website as compromised, a malicious website, if a known cryptocurrency indicator with a reputation score above a specified threshold (e.g., a reputation score above ten). By way of further example, the compromise component 110 may classify, as malicious or compromised, and block an email where the email contains a QR code for a known cryptocurrency indicator with a reputation score of 7.9 or above. Although described with reference to specified scores or thresholds, it should be understood that the reputation score or threshold may be established at any suitable quantity.

In some embodiments, each time a cryptocurrency indicator is extracted, components described in the present disclosure may use one or more classifiers (e.g., web crawling classifiers, similarity of websites, RegExes) searching for additional occurrences of the cryptocurrency indicator or other indicators of compromise. Once identified within websites, files, emails, blockchain, or other data sets, the components of the present disclosure may classify the data sets as malicious, as described above. Further components of the present disclosure may identify and associate malicious entities based on the cryptocurrency indicators, campaign identifiers, and other indicators of compromise. The components of the present disclosure may also identify cooperating malicious entities based on tracing of cryptocurrency transactions and cryptocurrency indicators, as described above.

Embodiments of the present disclosure allow for reduction in computing, networking, and storage resources used to gather, process, and store transaction information by eliminating non-relevant relations and transactions. In some instances, the present disclosure reduces an amount of computing resources and time for threat detection and response by optimizing classification processes using existing information from an existing threat intelligence database and threat intelligence-based source analysis. Further, embodiments of the present disclosure reduce resources and time used to manually investigate transactions and new campaigns by researchers, as only high potential transactions and features are used. Similarly, embodiments of the present disclosure apply enriched information to threat intelligence information and threat intelligence analysis. Such application reduces computing resources used to analyze data sets and transactions, classify other sources, block attacks and malicious communications, investigate threats, identify campaigns, and identify bad actors. Such collection and application of enriched information is performed automatically for all related data and indicators of compromise.

Figure 5:
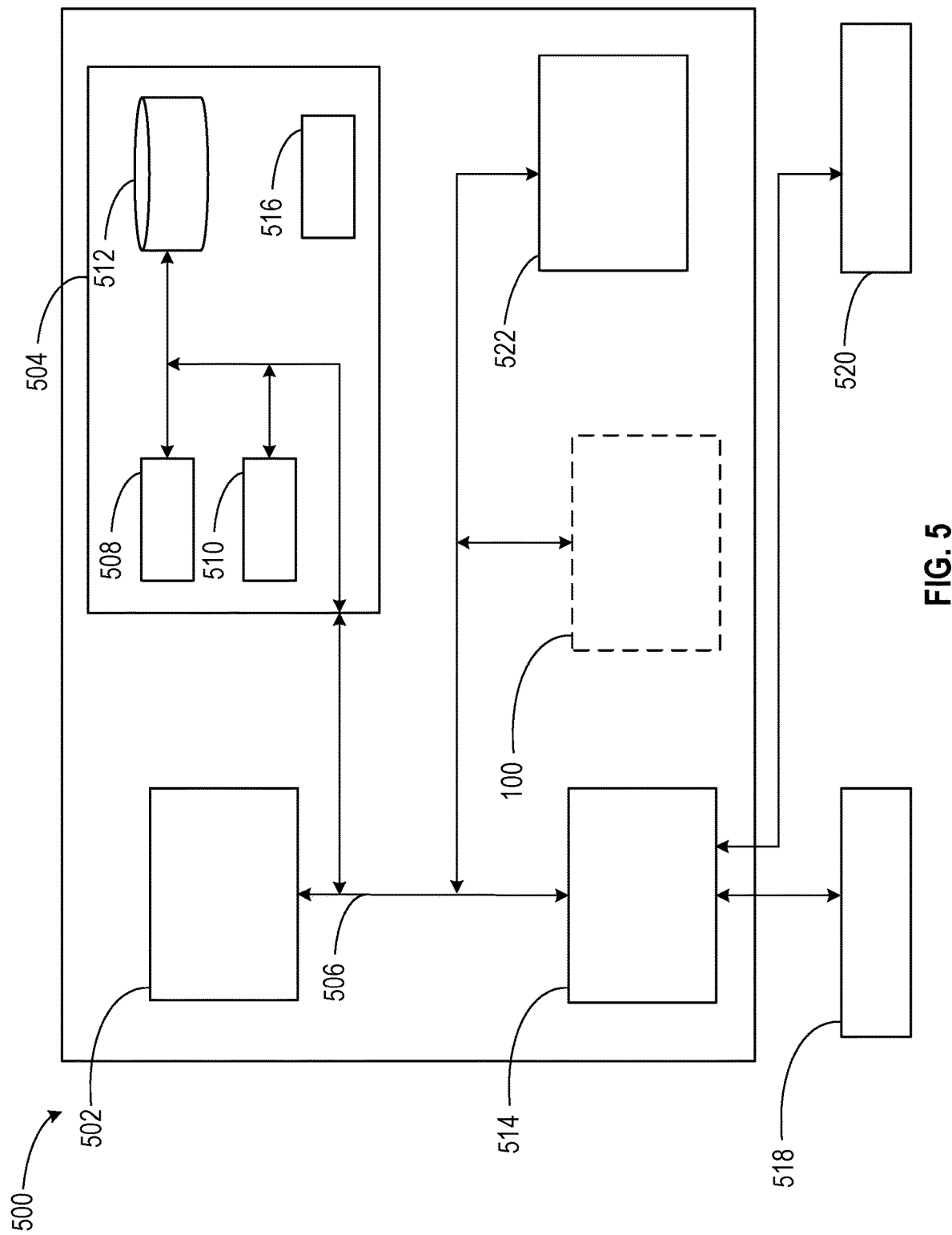
FIG. 5 depicts a block diagram of a computing system for identification of cryptocurrency transaction patterns and malicious entities, according to at least one embodiment.

Embodiments of the present disclosure may be implemented together with virtually any type of computer, regardless of the platform being suitable for storing and/or executing program code. FIG. 5 shows, as an example, a computing system 500 (e.g., cloud computing system) suitable for executing program code related to the methods disclosed herein and for identification of cryptocurrency transaction patterns and malicious entities.

The computing system 500 is only one example of a suitable computer system and is not intended to suggest any limitation as to the scope of use or functionality of embodiments of the present disclosure described herein, regardless, whether the computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 500 is shown in the form of a general-purpose computing device. The components of computer system/server 500 may include, but are not limited to, one or more processors 502 (e.g., processing units), a system memory 504 (e.g., a computer-readable storage medium coupled to the one or more processors), and a bus 506 that couple various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random-access memory (RAM) 508 and/or cache memory 510. Computer system/server 500 may further include other removable/non-removable, volatile/non-volatile computer system storage media. By way of example only, a storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, the system memory 504 may include at least one program product having a set (e.g., at least one) of program modules that are configured to carry out the functions of embodiments of the present disclosure.

The program/utility, having a set (at least one) of program modules 516, may be stored in the system memory 504 by way of example, and not limiting, as well as an operating system, one or more application programs, other program modules, and program data. Program modules may include one or more of the compromise component 110, the extraction component 120, the database component 130, the transaction component 140, and the generation component 150, which are illustrated in FIG. 1. Each of the operating systems, one or more application programs, other program modules, and program data or some combination thereof, may include an implementation of a networking environment. Program modules 516 generally carry out the functions and/or methodologies of embodiments of the present disclosure, as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that, although not shown, other hardware and/or software components could be used in conjunction with computer system/server 500. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Figure 6:
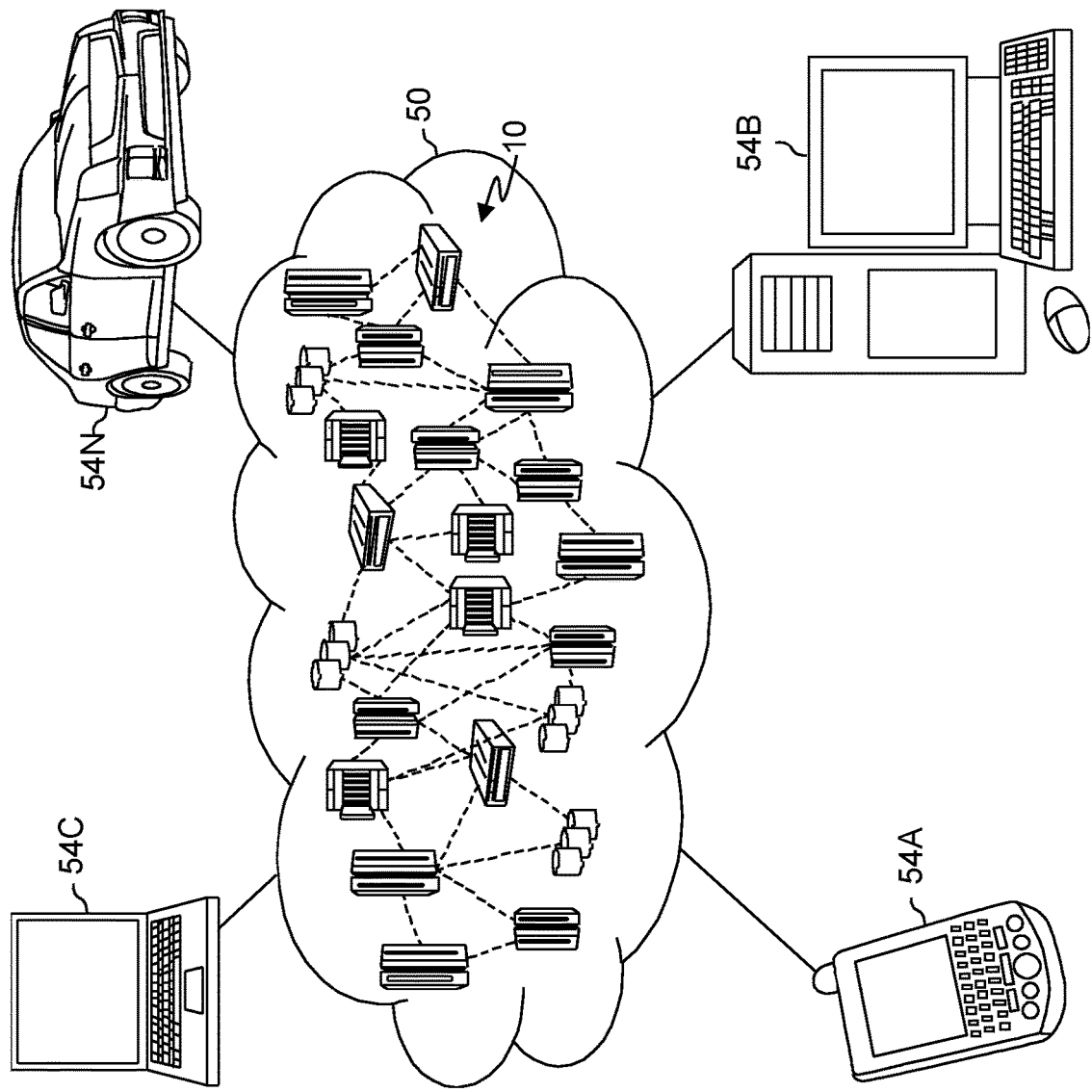
FIG. 6 is a schematic diagram of a cloud computing environment in which concepts of the present disclosure may be implemented, in accordance with an embodiment of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
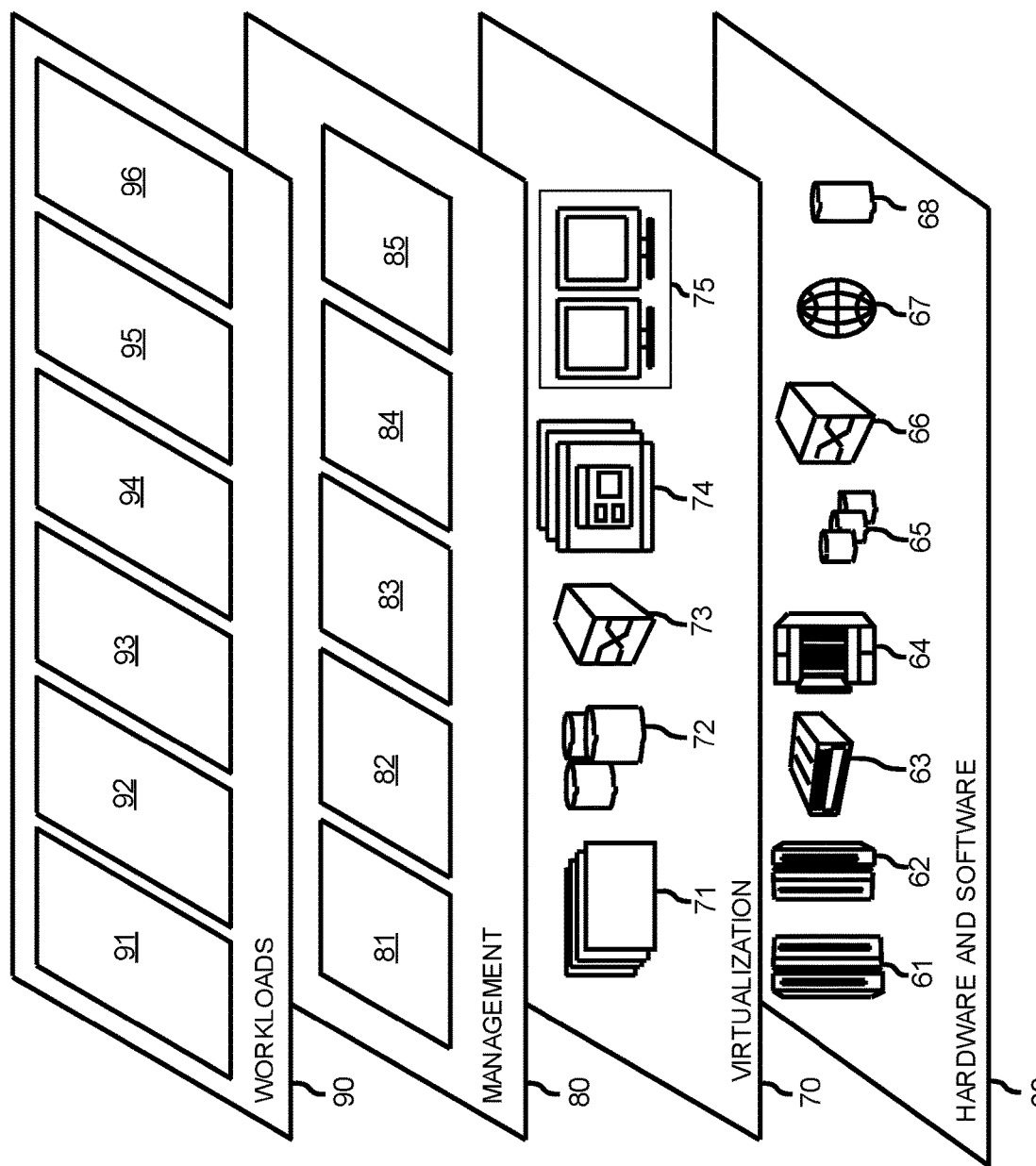
FIG. 7 is a diagram of model layers of a cloud computing environment in which concepts of the present disclosure may be implemented, in accordance with an embodiment of the present disclosure.

Referring now to FIG. 7, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network traffic direction processing 96.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer-readable storage medium (or media) having computer readable program instructions thereon for causing a processor to carry out aspects of the present invention.

The computer-readable storage medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer-readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations will be apparent to those of ordinary skills in the art without departing from the scope of the present disclosure. The embodiments are chosen and described in order to explain the principles of the present disclosure and the practical application, and to enable others of ordinary skills in the art to understand the present disclosure for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
   extracting, by an automated email scan, a cryptocurrency indicator within a compromised first data set representing a security threat independent of cryptocurrency transactions, the security threat being a phishing email;
   inserting, by a database server, the cryptocurrency indicator into a threat intelligence database as an indicator of compromise in a set of indicators of compromise as identifying the security threat;
   identifying, by the database server using a Blockchain Application Programming Interface (API) and a Representational State Transfer (RESTful) API, a set of cryptocurrency transactions associated with the cryptocurrency indicator;
   generating a transaction graph from the cryptocurrency indicator, the set of cryptocurrency transactions, and the compromised first data set, the transaction graph having a set of features representing the set of cryptocurrency transactions and one or more aspects of the compromised first data set defining at least one relationship between members of a set of cryptocurrency transactions;
   modifying the threat intelligence database with at least a portion of features from the set of features of the transaction graph; and
   determining, by a web crawling classifier, a second data set is a compromised second data set based on the cryptocurrency indicator, the transaction graph, and the threat intelligence database, the second data set being a website.

2. The method of claim 1, further comprising:
   accessing, by the automated email scan, a first data set including the phishing email; and
   determining the data set is compromised based on the threat intelligence database, the data set being the compromised first data set including the cryptocurrency indicator.

3. The method of claim 1, wherein the cryptocurrency indicator is a cryptocurrency address.

4. The method of claim 1, further comprising:
   associating the cryptocurrency indicator with an entity identifier within the threat intelligence database, the entity identifier representing a malicious entity.

5. The method of claim 1, further comprising:
   generating a reputation score for the cryptocurrency indicator; and
   associating the reputation score with the cryptocurrency indicator in the threat intelligence database.

6. The method of claim 1, wherein generating the transaction graph further comprises:
   identifying a subset of cryptocurrency transactions, associated with the cryptocurrency indicator from the set of cryptocurrency transactions, the subset of cryptocurrency transactions sharing one or more features of a set of features; and
   based on the subset of cryptocurrency transactions, tagging the cryptocurrency indicator as a campaign indicator.

7. The method of claim 6, further comprising:
   determining an entity identifier for the cryptocurrency indicator, the entity identifier associated with at least a portion of the subset of cryptocurrency transactions; and
   based on the campaign indicator, tagging the entity identifier as a malicious entity within the threat intelligence database.

8. A system, comprising:
   one or more processors; and
   a computer-readable storage medium, coupled to the one or more processors, storing program instructions that, when executed by the one or more processors, cause the one or more processors to perform operations comprising:
   extracting, by an automated email scan, a cryptocurrency indicator within a compromised first data set representing a security threat independent of cryptocurrency transactions, the security threat being a phishing email;
   inserting, by a database server associated with the one or more processors, the cryptocurrency indicator into a threat intelligence database as an indicator of compromise in a set of indicators of compromise as identifying the security threat;

identifying, by the database server using a Blockchain Application Programming Interface (API) and a Representational State Transfer (RESTful) API, a set of cryptocurrency transactions associated with the cryptocurrency indicator;

generating a transaction graph from the cryptocurrency indicator, the set of cryptocurrency transactions, and the compromised first data set, the transaction graph having a set of features representing the set of cryptocurrency transactions and one or more aspects of the compromised first data set defining at least one relationship between members of a set of cryptocurrency transactions;

modifying the threat intelligence database with at least a portion of features from the set of features of the transaction graph; and determining, by a web crawling classifier, a second data set is a compromised second data set based on the cryptocurrency indicator, the transaction graph, and the threat intelligence database, the second data set being a website.

9. The system of claim 8, wherein the operations further comprise:

accessing, by the automated email scan, a first data set including the phishing email; and determining the data set is compromised based on the threat intelligence database, the data set being the compromised first data set including the cryptocurrency indicator.

10. The system of claim 8, wherein the cryptocurrency indicator is a cryptocurrency address.

11. The system of claim 8, wherein the operations further comprise:

associating the cryptocurrency indicator with an entity identifier within the threat intelligence database, the entity identifier representing a malicious entity.

12. The system of claim 8, wherein the operations further comprise:

generating a reputation score for the cryptocurrency indicator; and associating the reputation score with the cryptocurrency indicator in the threat intelligence database.

13. The system of claim 8, wherein generating the transaction graph further comprises:

identifying a subset of cryptocurrency transactions, associated with the cryptocurrency indicator from the set of cryptocurrency transactions, the subset of cryptocurrency transactions sharing one or more features of a set of features; and based on the subset of cryptocurrency transactions, tagging the cryptocurrency indicator as a campaign indicator.

14. The system of claim 13, wherein the operations further comprise:

determining an entity identifier for the cryptocurrency indicator, the entity identifier associated with at least a portion of the subset of cryptocurrency transactions; and based on the campaign indicator, tagging the entity identifier as a malicious entity within the threat intelligence database.

15. A computer program product comprising a non-transitory computer readable storage medium having program instructions embodied therewith, the program instructions being executable by one or more processors to cause the one or more processors to perform operations comprising:

extracting, by an automated email scan, a cryptocurrency indicator within a compromised first data set representing a security threat independent of cryptocurrency transactions, the security threat being a phishing email;

inserting, by a database server, the cryptocurrency indicator into a threat intelligence database as an indicator of compromise in a set of indicators of compromise as identifying the security threat;

identifying, by the database server using a Blockchain Application Programming Interface (API) and a Representational State Transfer (RESTful) API, a set of cryptocurrency transactions associated with the cryptocurrency indicator;

generating a transaction graph from the cryptocurrency indicator, the set of cryptocurrency transactions, and the compromised first data set, the transaction graph having a set of features representing the set of cryptocurrency transactions and one or more aspects of the compromised first data set defining at least one relationship between members of a set of cryptocurrency transactions;

modifying the threat intelligence database with at least a portion of features from the set of features of the transaction graph; and determining, by a web crawling classifier, a second data set is a compromised second data set based on the cryptocurrency indicator, the transaction graph, and the threat intelligence database, the second data set being a website.

16. The computer program product of claim 15, wherein the operations further comprise:

accessing, by the automated email scan, a first data set including the phishing email; and determining the data set is compromised based on the threat intelligence database, the data set being the compromised first data set including the cryptocurrency indicator.

17. The computer program product of claim 15, wherein the operations further comprise:

associating the cryptocurrency indicator with an entity identifier within the threat intelligence database, the entity identifier representing a malicious entity.

18. The computer program product of claim 15, wherein the operations further comprise:

generating a reputation score for the cryptocurrency indicator; and associating the reputation score with the cryptocurrency indicator in the threat intelligence database.

19. The computer program product of claim 15, wherein generating the transaction graph further comprises:

identifying a subset of cryptocurrency transactions, associated with the cryptocurrency indicator from the set of cryptocurrency transactions, the subset of cryptocurrency transactions sharing one or more features of a set of features; and based on the subset of cryptocurrency transactions, tagging the cryptocurrency indicator as a campaign indicator.

20. The computer program product of claim 19, wherein the operations further comprise:

determining an entity identifier for the cryptocurrency indicator, the entity identifier associated with at least a portion of the subset of cryptocurrency transactions; and based on the campaign indicator, tagging the entity identifier as a malicious entity within the threat intelligence database.

* * * * *